(12) United States Patent
Huang et al.

(10) Patent No.: US 11,098,845 B2
(45) Date of Patent: Aug. 24, 2021

(54) MOUNT BASE

(71) Applicant: SYNCMOLD ENTERPRISE CORP., New Taipei (TW)

(72) Inventors: Chun-Hao Huang, New Taipei (TW); Chien-Cheng Yeh, New Taipei (TW); Ching-Hui Yen, New Taipei (TW)

(73) Assignee: SYNCMOLD ENTERPRISE CORP., New Taipei (TW)

( * ) Notice: Subject to any disclaimer, the term of this patent is extended or adjusted under 35 U.S.C. 154(b) by 0 days.

(21) Appl. No.: 16/871,524

(22) Filed: May 11, 2020

(65) Prior Publication Data

US 2020/0363010 A1  Nov. 19, 2020

Related U.S. Application Data

(60) Provisional application No. 62/848,051, filed on May 15, 2019.

(51) Int. Cl.
| | |
|---|---|
| *F16M 13/00* | (2006.01) |
| *F16M 13/02* | (2006.01) |
| *F16B 13/08* | (2006.01) |
| *A47B 97/00* | (2006.01) |

(52) U.S. Cl.
CPC ....... *F16M 13/022* (2013.01); *F16B 13/0808* (2013.01); *A47B 97/00* (2013.01); *A47B 2097/005* (2013.01); *F16M 2200/022* (2013.01); *F16M 2200/027* (2013.01)

(58) Field of Classification Search
CPC .................. F16M 13/022; A47B 97/00; A47B 2097/005; F16B 13/0808; F16B 2/185; F16B 13/04
USPC ...... 248/122.1, 689, 121, 421, 176.1, 309.1, 248/316.1; 411/340, 341, 345
See application file for complete search history.

(56) References Cited

U.S. PATENT DOCUMENTS

| | | | |
|---|---|---|---|
| 6,250,865 B1 * | 6/2001 | McSherry | F16B 13/0808 411/29 |
| 7,226,261 B1 * | 6/2007 | Bristol | F16B 13/0808 411/340 |
| 7,547,171 B2 * | 6/2009 | McDuff | A47G 1/20 411/400 |
| 7,955,392 B2 * | 6/2011 | Dewey | A61B 17/7068 623/17.16 |
| 8,303,224 B2 * | 11/2012 | McDuff | F16B 13/003 411/341 |
| 8,449,236 B2 * | 5/2013 | McDuff | F16B 13/0808 411/344 |
| 9,394,932 B2 * | 7/2016 | McDuff | F16B 13/0808 |
| 2013/0243546 A1 * | 9/2013 | McDuff | F16B 13/003 411/341 |
| 2020/0271145 A1 * | 8/2020 | Gill | F16B 2/185 |

* cited by examiner

*Primary Examiner* — Todd M Epps
(74) *Attorney, Agent, or Firm* — Muncy, Geissler, Olds & Lowe, P.C.

(57) ABSTRACT

The present invention relates to a mount base, particularly a mount base set on a desktop for mounting a support arm of a display.

21 Claims, 11 Drawing Sheets

MOUNT BASE

CROSS REFERENCE TO RELATED APPLICATION

This application claims the benefit of U.S. Provisional Application Ser. No. 62/848,051 filed on May 15, 2019. The entirety of the application is incorporated herein by reference.

BACKGROUND OF THE INVENTION

1. Field of the Invention

The present invention relates to a mount base. More particularly, the present invention relates to a mount base set on a desktop for mounting a support arm, which is supporting a display.

2. Description of Related Art

Conventionally, a supporting arm bearing a display is set on a desktop through a mount base which penetrates through a hole of the desktop, wherein a clamping plate of the mount base is adjusted by hand under the desktop to convert it into a released position, after that, a clamping module of the mount base is then adjusted above the desktop so that the desktop is clamped between the clamping plate and the clamping module. However, the conventional mount base must be adjusted under a desktop to covert it from a received position to the released position, thus, the operation of the mount base is less convenient for the users. Besides, the clamping module only can be fine-tuned toward the desktop to clamp to the surface of the desktop, which is time consuming on the operation.

SUMMARY OF THE INVENTION

The main object of the present invention is to provide a mount base which is capable of detachably being set in a hole of a plate. The mount base comprises a guiding rod element extending along an axis and having a first end, a second end opposite to the first end, a main portion between the first end and the second end, and a receiving space, wherein the main portion is formed with a first external screw thread and the receiving space is penetrated through the first end to the second end along the axis; a shaft movably penetrating in the receiving space from the first end to be switched between a locked position and an unlocked position, wherein the shaft includes a hook; a first clamping element having a first end section, a second end section opposite to the first end section, a pivot section between the first end section and the second end section, and a connecting element disposed at the first end section, wherein the pivot section pivotably connects to the second end of the guiding rod element, and the first clamping element is able to be switched between a received position and a released position; a clamping module being movably sleeved on the guiding rod element. When the mount base penetrates through the hole of the plate and is at a supportable status, the first clamping element remains at the released position and clamps the plate with the clamping module, and when the first clamping element is switched to the received position, the mount base is removable from the hole.

In an embodiment, when the mount base penetrates through the hole of the plate and the shaft is switched from the locked position to an unlocked position along the axis, the first clamping element rotates to the released position by deviating from the axis with respect to the guiding rod element so that a distance between the clamping module and the first clamping element is able to be adjusted by adjusting a position of the clamping module with respect to the guiding rod element to clamp the plate; and when the first clamping element is at the received position, the connecting element of the first clamping element and the hook of the shaft are engaged so that the shaft is at the locked position and the mount base is removable from the hole.

In an embodiment, the first clamping element tends to be located at the released position.

In an embodiment, when an external force is applied to make the first clamping element rotate from the released position to the received position, the connecting element abuts against the hook to move the shaft to the unlocked position, then removing the external force so that the shaft backs to the locked position, and the connecting element and the hook are engaged.

In an embodiment, the hook has a first extending section and a second extending section connecting to the first extending section, wherein the first extending section and the second extending section jointly form an opening for locating the connecting element.

In an embodiment, the first clamping element further has an elastic component being disposed at the pivot section and abutting against the guiding rod element and the pivot section therebetween so that the first clamping element is ordinarily located at the released position, and the first clamping element is located along the axis and at least the first end section is disposed in the receiving space when the first clamping element is at the received position.

In an embodiment, the shaft further has a main body, a pressing element, a connected hole, a pressed elastic element, and a limit hole, wherein the main body has a first end portion and a second end portion opposite to the first end portion, the pressing element is disposed at the first end portion, the hook connects to the second end portion, the limit hole is formed on the main body, the connected hole is intercommunicated with the first end portion and the limit hole along the axis, and the pressed elastic element is disposed in the connected hole. Furthermore, the guiding rod element further has a through hole and a fixed rod penetrating through the through hole and the limit hole so that the pressed elastic element abuts against the pressing element and the fixed rod therebetween.

In an embodiment, the limit hole is an elongated hole, and when the shaft is switched from the locked position to the unlocked position, the fixed rod moves from a first position to a second position corresponding to the limit hole and the pressed elastic element is compressed increasingly.

In an embodiment, the pressing element is adjustably screwed to the first end portion to adjust a pre-compressed amount of the pressed elastic element.

In an embodiment, the first clamping element further has a limit surface, and wherein the limit surface abuts against a resisting portion of the second end so that the first clamping element is substantially perpendicular to the axis when the first clamping element is switched to the released position from the received position.

In an embodiment, the clamping module includes a switch unit being movably sleeved on the guiding rod element, and having a first internal screw thread selectively engaging with the first external screw thread; and a second clamping element being movably sleeved on the guiding rod element and connecting to the switch unit.

In an embodiment, the switch unit further has a knob and a switching element, the knob has an elongated receiving portion for disposing the switching element, the switching element has a pressing end outwardly penetrating the knob, the first internal screw thread is formed on the switching element, and the switch unit is sleeved on the guiding rod element via the switching element. The switching element is able to be switched between a third position and a fourth position, wherein when the switching element is at the third position, the first internal screw thread and the first external screw thread are engaged and the switch unit is able to move along the axis in a manner of screwing with respect to the guiding rod element, whereas when the switching element is at the fourth position, the first internal screw thread detaches from the first external screw thread so that the switch unit is able to move along the axis without screwing on the guiding rod element.

In an embodiment, the switch unit further has a switching elastic element opposite to the pressing end and abutting against the knob and the switching element therebetween so that the switching element tends to be at the third position, and when the switching element is at the fourth position, the degree of the compression of the switching elastic element is increased.

In an embodiment, the switching elastic element is a compression spring.

In an embodiment, the switch unit further includes a circlip disposed on the knob, and the second clamping element at least partially clamped between the circlip and the knob, thereby the knob is able to rotate on the second clamping element about the axis.

In an embodiment, the second clamping element includes at least one sliding block, and the guiding rod element further includes at least one groove formed on the main portion parallel to the axis, wherein the at least one sliding block extends into the at least one groove so that the guiding rod element is able to linearly move along the axis with respect to the second clamping element.

In an embodiment, the first extending section and the second extending section form an included angle less than 90 degrees.

In an embodiment, the elastic component is a torsion spring.

In an embodiment, the connecting element is cylindrical and is able to slide with respect to the second extending section to engage with the opening when the first clamping element is switched to the received position.

In an embodiment, the hook has an inclined surface formed on the second extending section so that the connecting element is able to slide along the inclined surface to engage with the hook when the first clamping element is switched to the received position.

In an embodiment, the pressing element is a set screw.

DETAILED DESCRIPTION OF THE PREFERRED EMBODIMENT

The advantages and effects will be better understood from the following description. It should be noted that the following diagrams are simplified schematic diagrams. The number, shape, and size of components shown in the diagrams can be arbitrarily changed according to the actual practices, and the component layout can be even more complicated. The invention may also be implemented or applied through other embodiments, and the details in the specification may also be modified and changed based on different views and applications without departing from the spirit of the invention.

Figure 1:
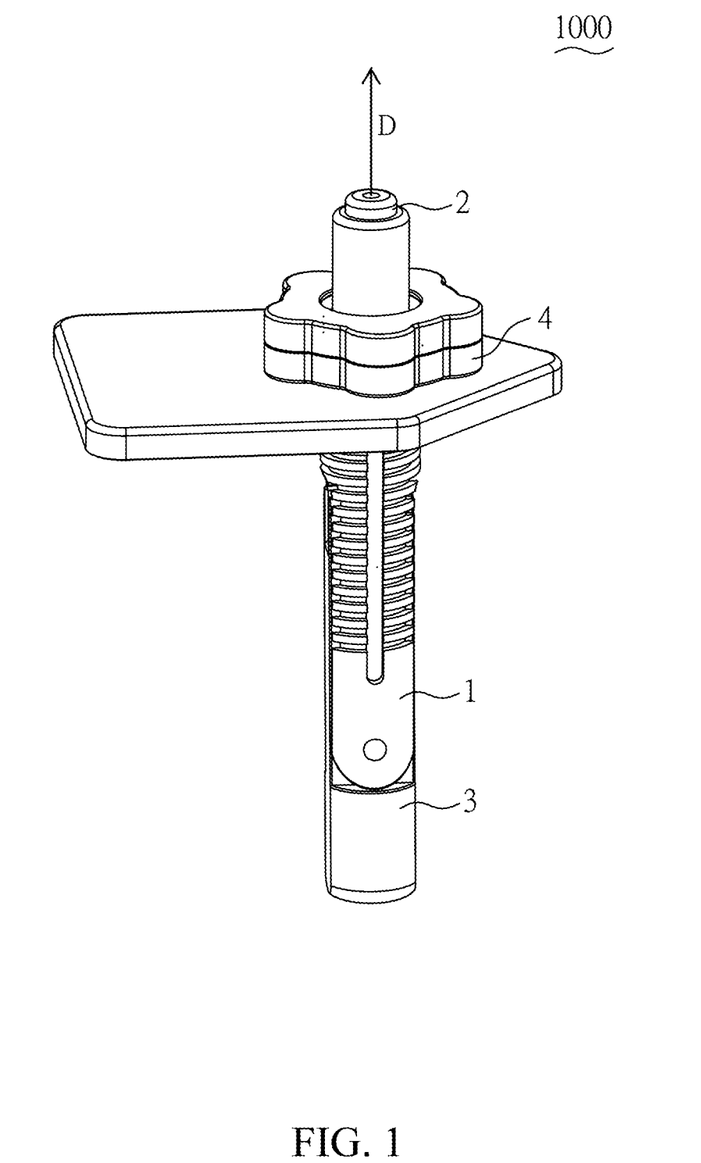
FIG. 1 is a perspective view showing a mount base of the present invention.
Figure 2:
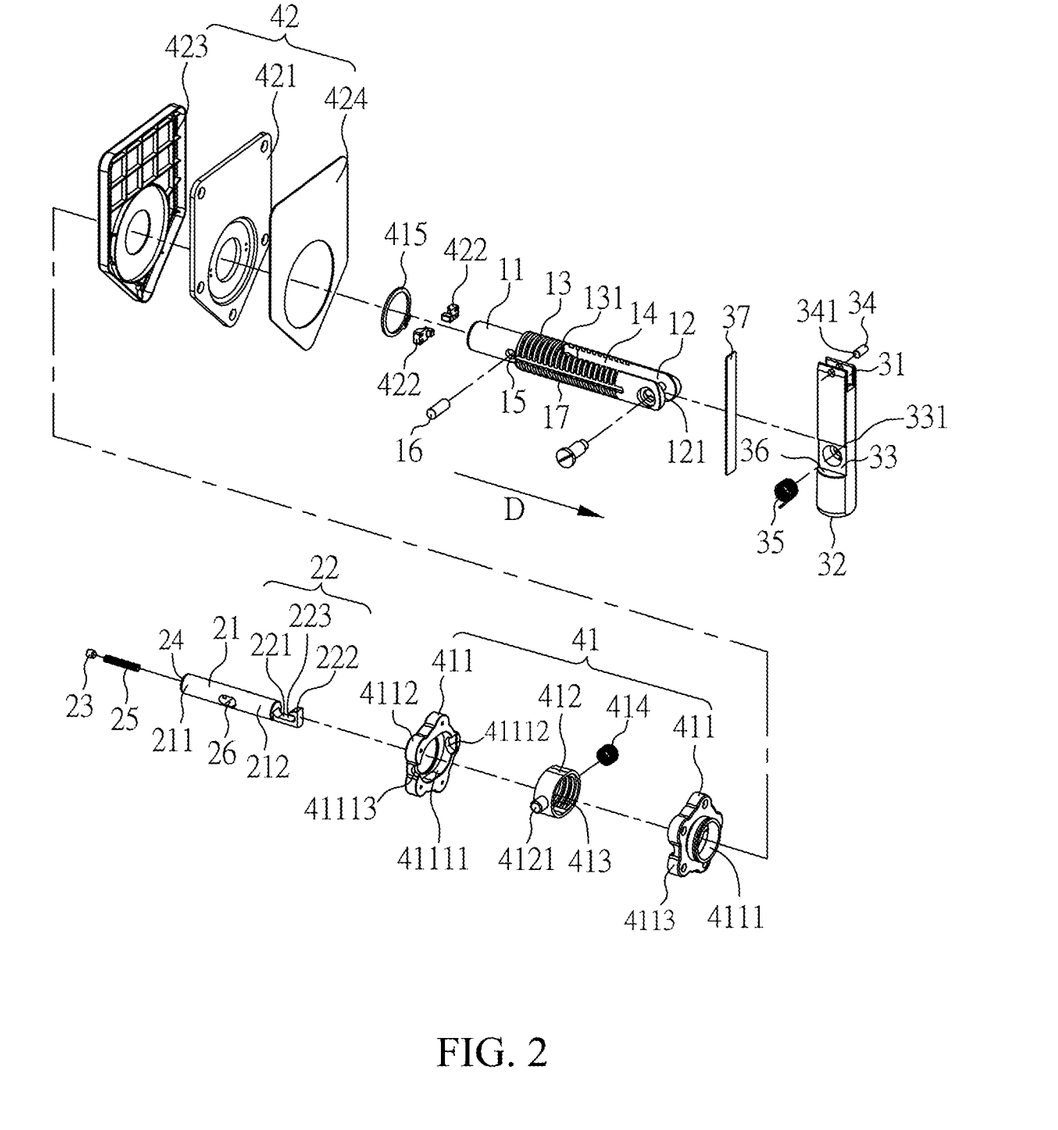
FIG. 2 is a perspective exploded view showing a mount base of the present invention.
Figure 7:
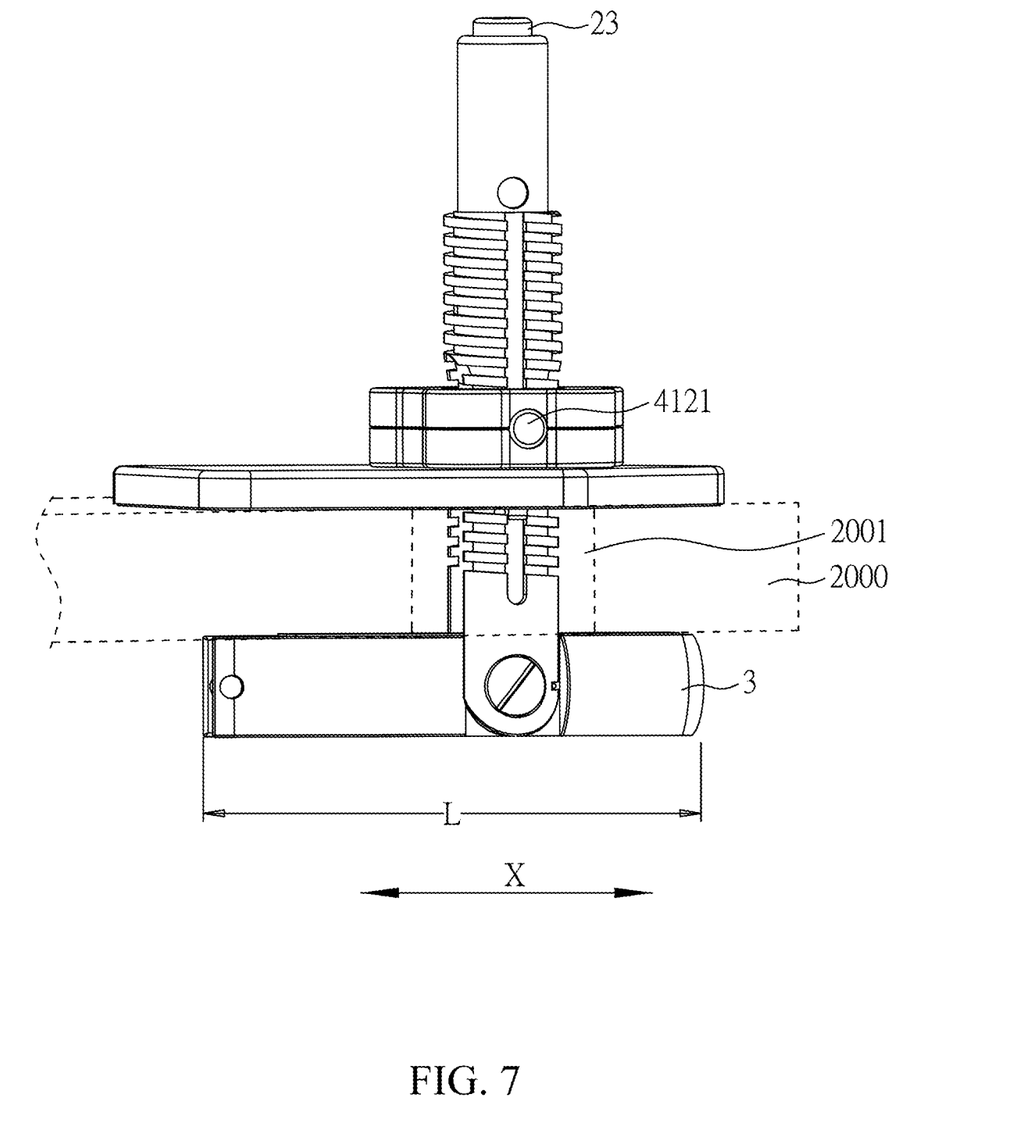
FIG. 7 is a schematic view showing an operation of a mount base of the present invention.

FIG. 1 and FIG. 2 are a perspective view and an exploded view showing a mount base 1000 of the present invention, respectively. The mount base 1000 is capable of detachably being set in a hole 2001 of a plate 2000, for example, a desktop (as shown in FIG. 7), and mainly comprises a guiding rod element 1, a shaft 2, a first clamping element 3, and a clamping module 4.

The guiding rod element 1 extends along an axis D and has a first end 11, a second end 12, a main portion 13, a receiving space 14, a through hole 15, a fixed rod 16, and two grooves 17. The second end 12 is formed opposite to the first end 11 and has a resisting portion 121, the main portion 13 that comprises a first external screw thread 131 is formed between the first end 11 and the second end 12, the receiving space 14 is penetrated through the first end 11, the main portion 13, and the second end 12 along the axis D, the through hole 15 is formed on the main portion 13 adjacent to the first end 11 and is intercommunicated with the receiving space 14, the fixed rod 16 penetrates through the through hole 15, and the grooves 17 are formed on an outer surface of the main portion 13 and are parallel to the axis D.

Figure 3:
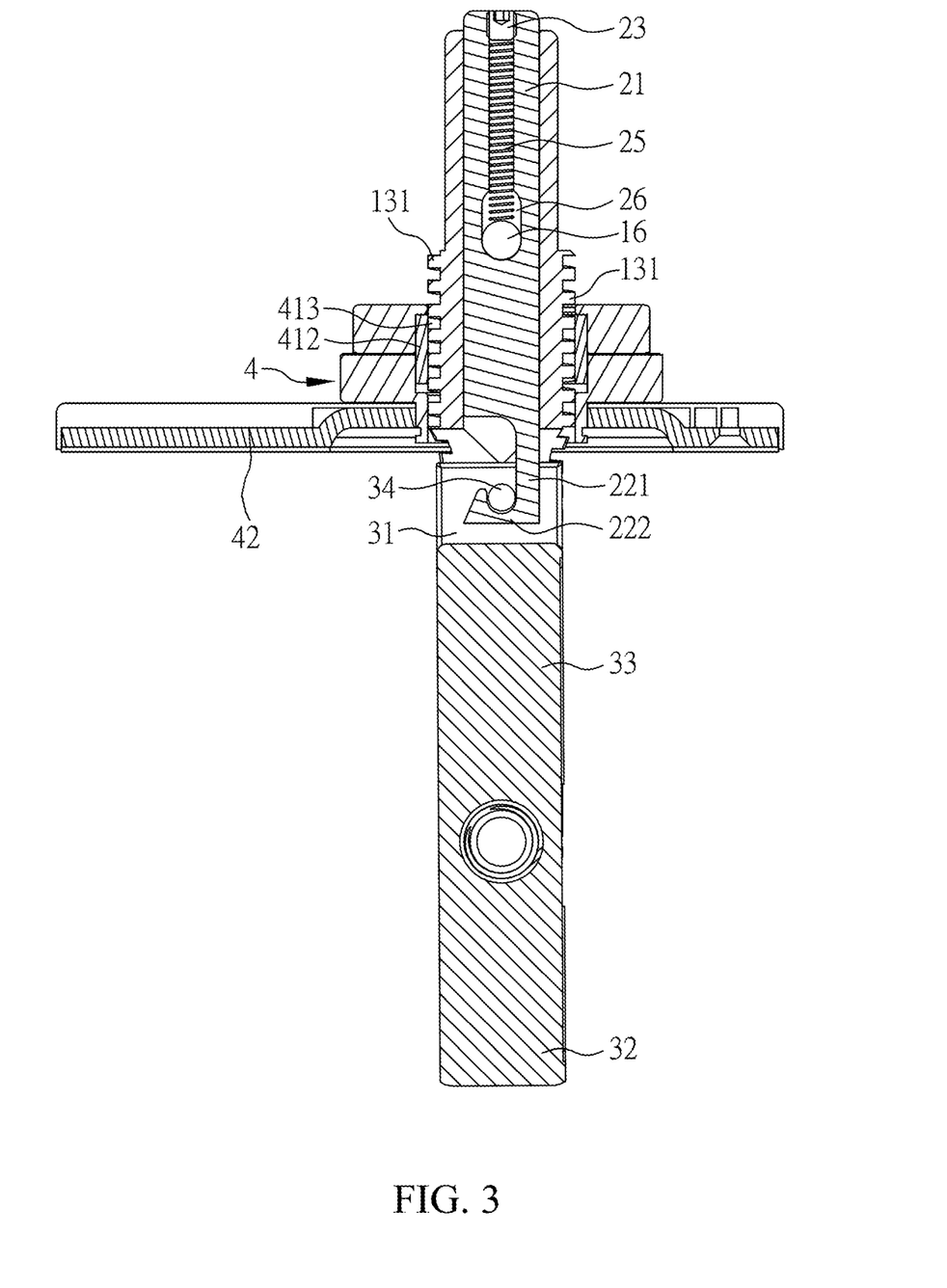
FIG. 3 is a schematic cross-sectional view showing a mount base of the present invention.
Figure 6:
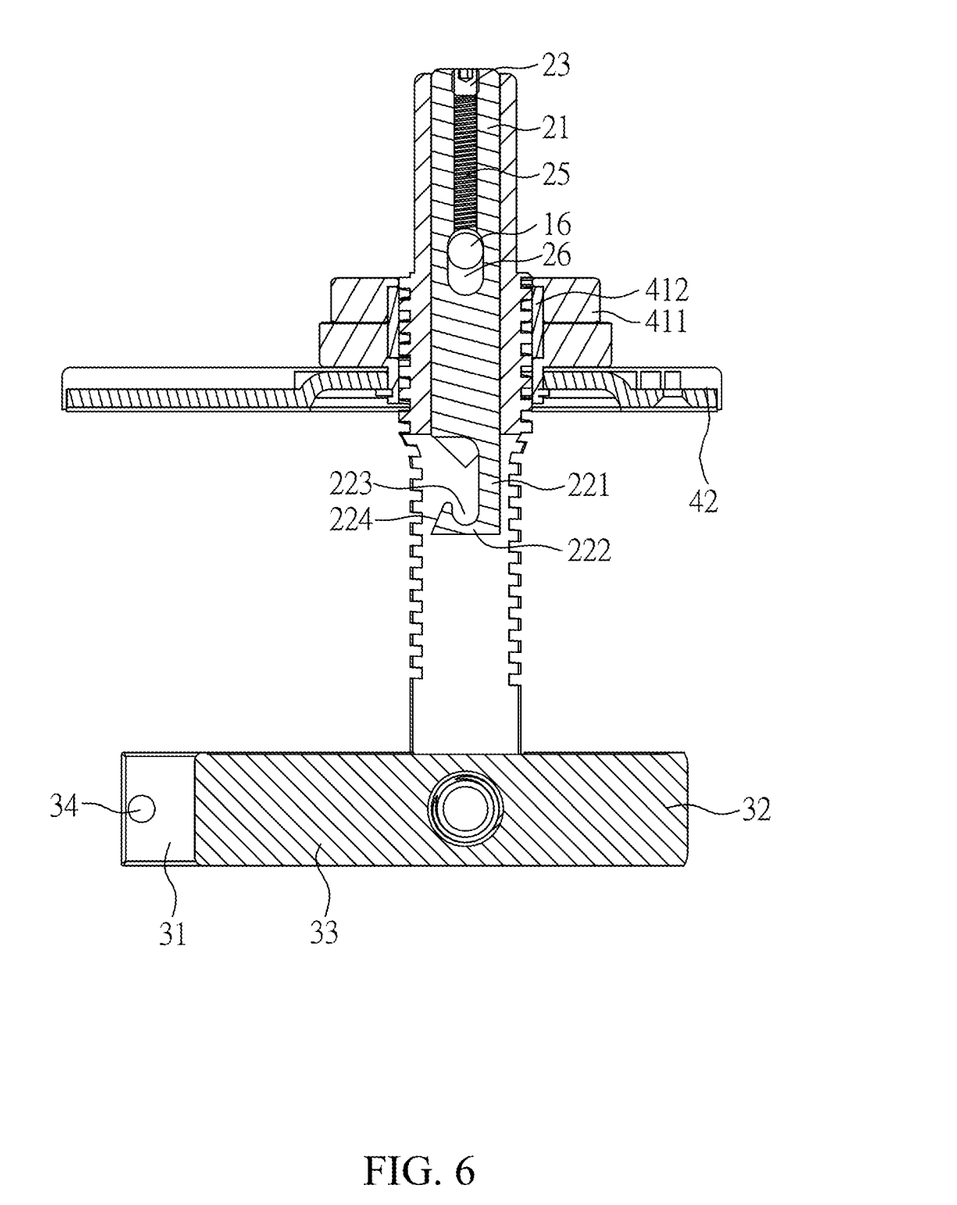
FIG. 6 is another cross-sectional view showing a mount base of the present invention.

The shaft 2 movably penetrates in the receiving space 14 along the axis D from the first end 11. The shaft 2 comprises a main body 21, a hook 22, a pressing element 23, a connected hole 24, a pressed elastic element 25, and a limit hole 26. In detail, the main body 21 has a first end portion 211 and a second end portion 212 opposite to each other. As shown in FIG. 3 and FIG. 6, the hook 22 is connected to the second end portion 212 and has a first extending section 221, a second extending section 222, an opening 223, and an inclined surface 224, wherein the first extending section 221 and the second extending section 222 are connected, have an included angle approximately less than 90 degrees therebetween, and jointly form the opening 223, while the inclined surface 224 is formed on the second extending section 222. The pressing element 23 is a set screw adjustably screwed to the first end portion 211 and is adjacent to the first end 11 of the guiding rod element 1. The connected hole 24 is intercommunicated with the first end portion 211 and the limit hole 26 formed on the main body 21 along the axis D. The pressed elastic element 25 is disposed in the connected hole 24. Besides, the fixed rod 16 penetrates through the through hole 15 and the limit hole 26 so that the pressed elastic element 25 can be abutted between the pressing element 23 and the fixed rod 16, and a pre-compressed amount of the pressed elastic element 25 can be adjusted through screwing the pressing element 23. The limit hole 26 is an elongated hole, and thus, when the shaft 2 is moved on the axis D by a force, the fixed rod 16 can move relative to the limit hole 26. When the fixed rod 16 respectively abuts against the two ends of the limit hole 26, a position limiting effect will be realized.

The first clamping element 3 has a first end section 31, a second end section 32, a pivot section 33, a connecting element 34, an elastic component 35, a limit surface 36, and a first gasket 37, wherein the second end section 32 is formed opposite to the first end section 31, while the pivot section 33 is disposed between the first end section 31 and the second end section 32. The pivot section 33 has a pivot hole 331; thus, the first clamping element 3 is pivotably connected to the second end 12 of the guiding rod element 1. Also, the connecting element 34 is disposed at the first end section 31, is formed in a cylindrical shape, and can be selectively disposed in the opening 223 of the hook 22. The elastic component 35 is a torsion spring, one end of which abuts against the second end 12 of the guiding rod element 1, while the other end of which abuts against the pivot section 33 and provides a pre-torsional force. Furthermore, the limit surface 36 is formed on the pivot section 33, and a first gasket 37 is disposed on the pivot section 33 as well.

Figure 8:
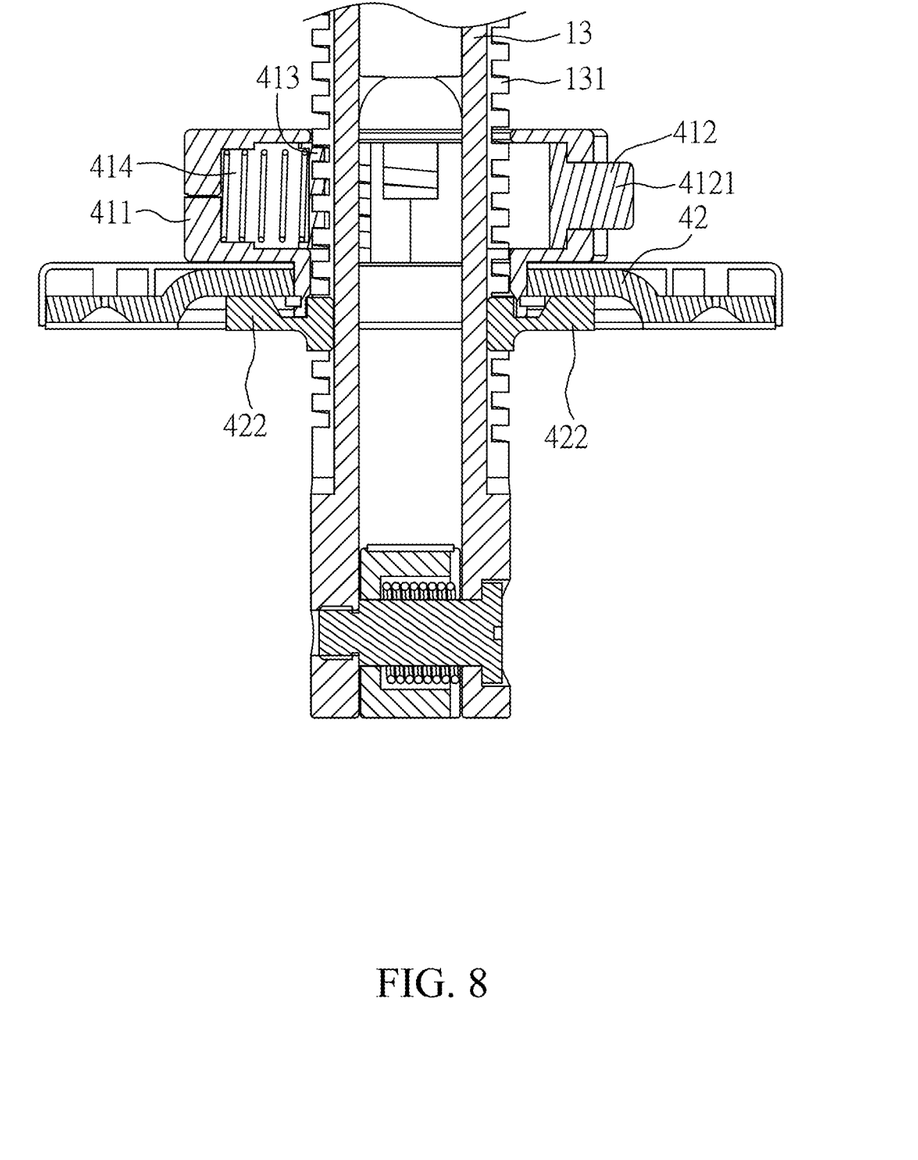
FIG. 8 is a partial cross-sectional view showing a mount base of the present invention.

The clamping module 4 comprises a switch unit 41 and a second clamping element 42. The switch unit 41, which is movably sleeved on the guiding rod element 1, has a knob 411, a switching element 412, a first internal screw thread 413, a switching elastic element 414, and a circlip 415. The knob 411 has an elongated receiving portion 4111 for disposing the switching element 412. In the present embodiment, the knob 411 is composed of a first component 4112 and a second component 4113 to assemble the switching element 412 and the switching elastic element 414 therein. The receiving portion 4111, which is jointly defined by the first component 4112 and the second component 4113, has a primary space 41111, a notch 41112, and a mouth 41113. The switching element 412 is mainly disposed in the primary space 41111 and has a pressing end 4121, wherein the pressing end 4121 outwardly penetrates the knob 411 from the mouth 41113 of the receiving portion 4111. The first internal screw thread 413 is formed on the switching element 412 and selectively engages with the first external screw thread 131 (see FIG. 8). The switching elastic element 414 is a compression spring disposed in the notch 41112 of the receiving portion 4111, is opposite to the pressing end 4121, and is abutted between the knob 411 and the switching element 412 (see FIG. 8) to provide a preload. The circlip 415 is disposed on the knob 411, and the second clamping element 42 is partially clamped between the circlip 415 and the knob 411, and thus, the knob 411 is able to rotate on the second clamping element 42 about the axis D. The second clamping element 42 is movably sleeved on the guiding rod element 1 and is connected to the switch unit 41. Furthermore, the second clamping element 42 comprises a main board 421, a pair of sliding blocks 422, a housing 423, and a second gasket 424. The sliding blocks 422 are symmetrically disposed on the main board 421 and respectively corresponds to and extends into the groove 17 so that the guiding rod element 1 is able to linearly move with respect to the second clamping element 42 along the axis D.

Furthermore, the housing 423 covers the side of the main board 421 away from the first clamping element 3, while the second gasket 424 is disposed on the other side of the main board 421.

The operation process of the mount base 1000 of the present embodiment will be described in detail as followed. First, as shown in FIG. 3, the shaft 2 needs to be adjusted to a locked position before the mount base 1000 has been inserted into a hole 2001 of the plate 2000. Said lock position, namely, the hook 22 of the shaft 2 and the connecting element 34 of the first clamping element 3 are engaged, wherein the connecting element 34 is engaged with the opening 223. The first clamping element 3 is switched to a received position, that is, the first clamping element 3 is located along the axis D and at least the first end section 31 is disposed in the receiving space 14 of the guiding rod element 1. Moreover, the clamping module 4 is at an initial position that the first internal screw thread 413 formed on an inner surface of the switching element 412 is engaged with an end of the first external screw thread 131 away from the first clamping element 3. Here, the second clamping element 42 does not cover the first clamping element 3.

Figure 4:
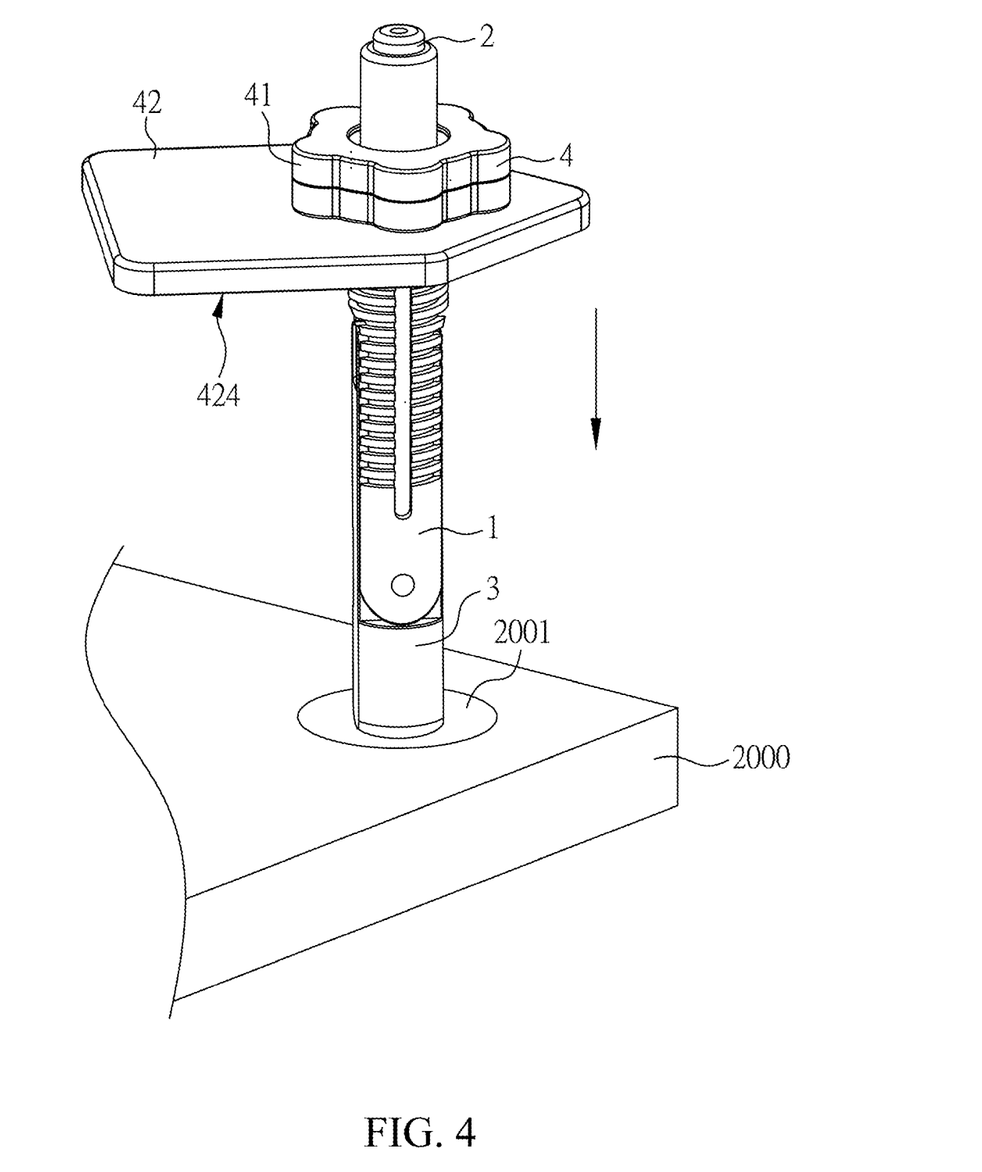
FIG. 4 is a schematic view showing an operation of a mount base of the present invention.
Figure 5:
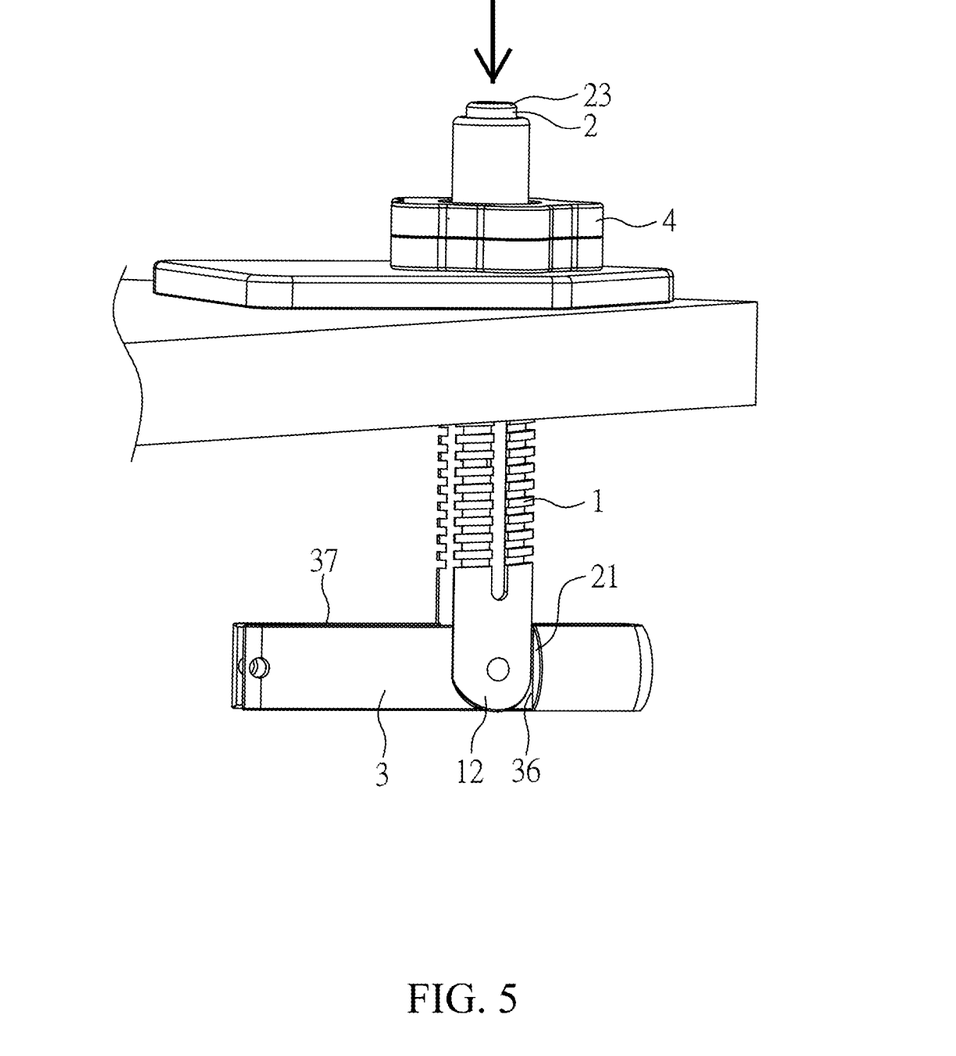
FIG. 5 is a schematic view showing an operation of a mount base of the present invention.
Figure 9:
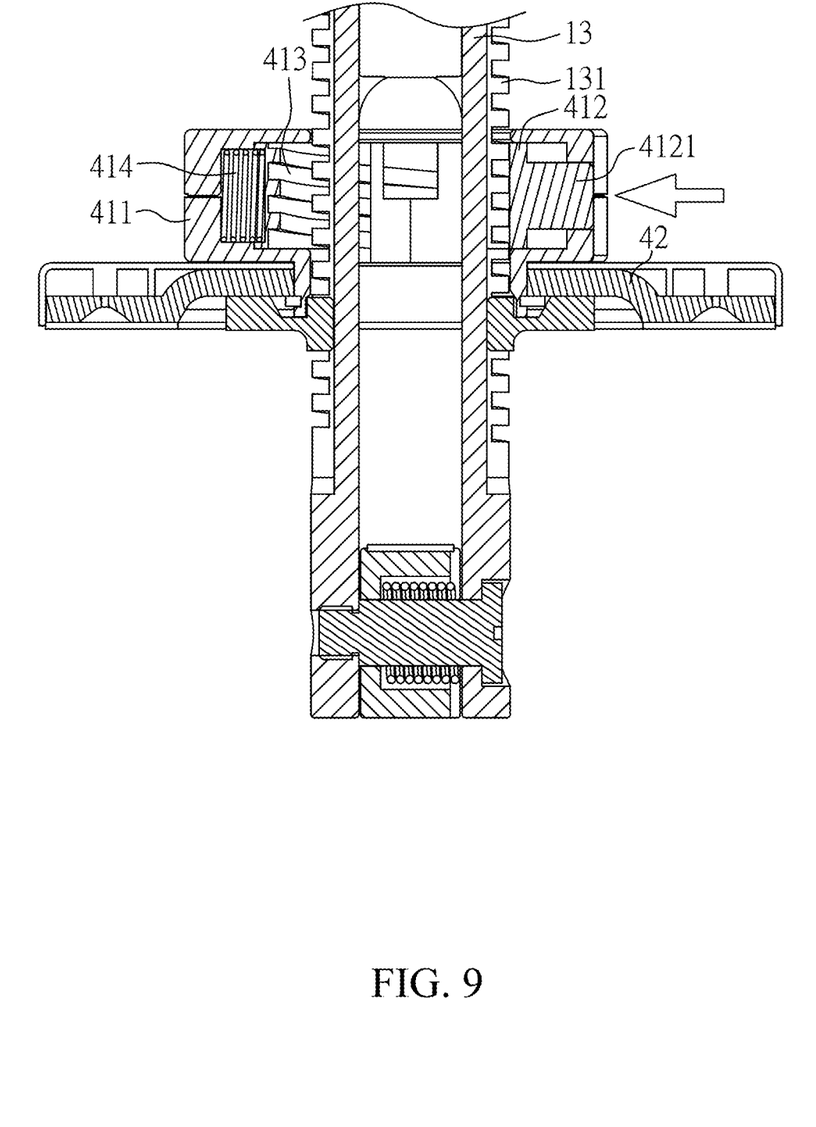
FIG. 9 is a partial cross-sectional view showing a mount base of the present invention.

Next, as shown in FIG. 4, inserting the mount base 1000 into the hole 2001 of the plate 2000 until the clamping module 4 is abutted on the plate 2000. The next step, as shown in FIG. 5, pressing the pressing element 23 so that the fixed rod 16 can be switched from a first position (FIG. 3) to a second position (FIG. 6) corresponding to the limit hole 26. Meanwhile, a degree of compression of the pressed elastic element 25 increases, and the shaft 2 is switched along the axis D toward the second end 12 to change the status from the locked position to an unlocked position. Under the status of unlocked position, the hook 22 and the connecting element 34 are detached, and the first clamping element 3 tends to be located at a released position due to the pre-torsional force provided by the elastic component 35 (see FIG. 6). Therefore, the first clamping element 3 rotates from the received position by deviating from the axis D with respect to the guiding rod element 1 until the limit surface 36 is abutted against the resisting portion 121 of the second end 12 and stopped at the released position. Meanwhile, the first clamping element 3 is substantially perpendicular to the axis D. Furthermore, as shown in FIG. 7, when pressing the pressing end 4121 of the switching element 412 of the clamping module 4, a location of the switching element 412 will be switched from a third position (FIG. 8) to a fourth position (FIG. 9) along a axis perpendicular to the axis D. In detail, at the status when the switching element 412 is located at the third position, the first internal screw thread 413 is engaged with the first external screw thread 131 formed on the guiding rod element 1, and because of the preload provided by the switching elastic element 414, the switching element 412 tends to be at the third position. However, at the status when the switching element 412 is forced and being switched to the fourth position, the degree of the compression of the switching elastic element 414 is increased, the first internal screw thread 413 and the first external screw thread 131 are detached, and thus the switch unit 41 will be able to move along the axis D quickly without screwing on the guiding rod element 1 (i.e. relative coarse control).

Figure 10:
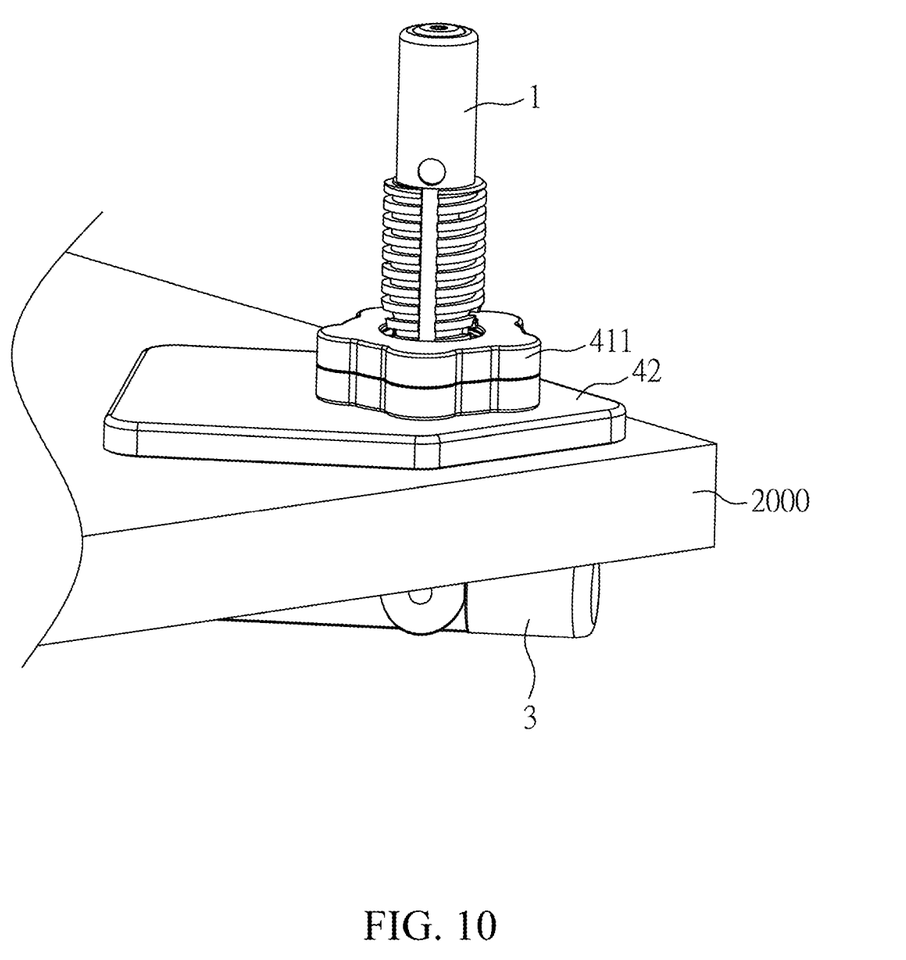
FIG. 10 is a schematic view showing an operation of a mount base of the present invention.

Hence, a distance between the second clamping element 42 and the first clamping element 3 on the axis D can be adjusted quickly by switching the switching element 412 to the fourth position first, and then switches the switching element 412 back to the third position. Followed by rotating the knob 411, the first clamping element 3 or the second clamping element 42 can thus be adjusted finely through the engagement of the first internal screw thread 413 and the first external screw thread 131, making the first clamping element 3 or the second clamping element 42 be able to move toward the plate 2000 along the axis D (i.e. relative fine-tuning). Therefore, the plate 2000 can firmly be clamped by the first clamping element 3 and the second clamping element 42. That is, the mount base 1000 firmly clamps the plate 2000 and is in a supportable status. In detail, after applying an external force on the pressing end 4121 to switch the switching element 412 to the fourth position, applying an external force again on the guiding rod element 1 to let the guiding rod element 1 move quickly with respect to the clamping module 4 retained abutting on the plate 2000, thereby driving the first clamping element 3 to approach the plate member 2000 along the axis D rapidly until the first gasket 37 of the first clamping element 3 contacts with the plate 2000. Alternatively, it is also possible to move the mount base 1000 upwards by applying an external force until the first clamping element 3 being abutted on the plate 2000, and then applying an external force again on the pressing end 4121 to have the switching element 412 be switched to the fourth position. Afterwards, let the clamping module 4 approach to the plate 2000 along the axis D rapidly until the second gasket 424 of the second clamping element 42 contacts with the plate 2000 (that is, the plate 2000 is clamped by the first clamping element 3 and the second clamping element 42 respectively on both sides). Next, removing the external force pressing the pressing end 4121 to have the switching element 412 be switched back to the third position by the preload of the switching elastic element 414. As shown in FIG. 10, the user may able to rotate the knob 411 again, and the distance between the second clamping element 42 and the first clamping element 3 may be adjusted finely by screwing the switch unit 41 with respect to the guiding rod element 1. Therefore, the plate 2000 can be clamped by the second clamping element 42 and the first clamping element 3 reliably.

Figure 11:
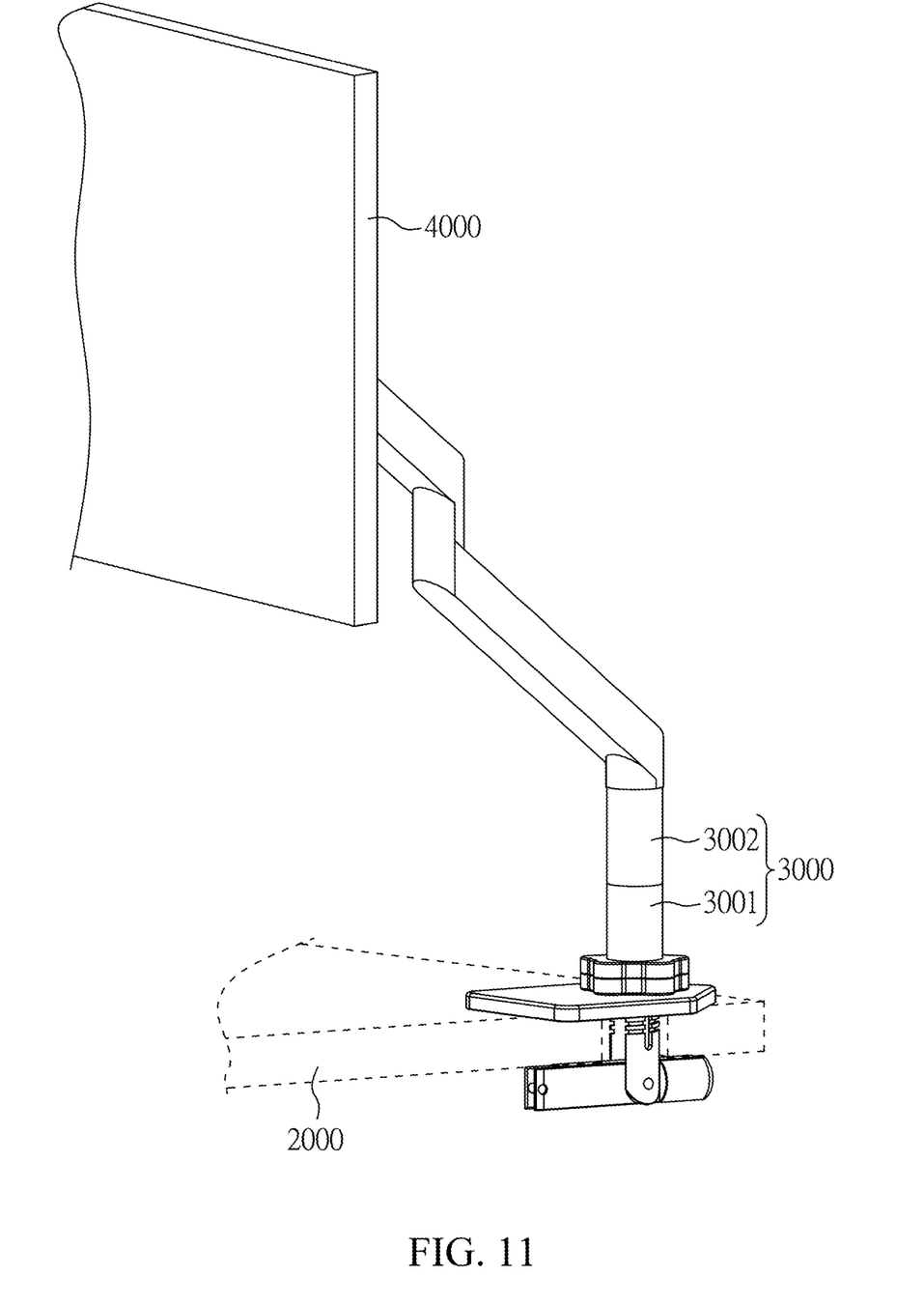
FIG. 11 is a schematic view showing an operation of a mount base of the present invention.

Furthermore, as shown in FIG. 11, when the mount base 1000 is in the supportable status, a support arm 3000 may be further sleeved on the mount base 1000. The support arm 3000 comprises an adapter sleeve 3001 and a main arm 3002, wherein the adapter sleeve 3001 can be firstly sleeved on the main portion 13 of the guiding rod element 1, and then make the main arm 3002 be sleeved on the adapter sleeve 3001 to bear the display 4000.

It should be noted that a length L of the first clamping element 3 on a first axis X perpendicular to the axis D is longer than a diameter of the hole 2001 (see FIG. 7) when the first clamping element 3 is in the released position. This can ensure that the first clamping element 3 will be firmly abutted on the plate 2000 while the mount base 1000 is in the supportable status.

Next, as to remove the mount base 1000 from the plate 2000, an external force is needed to be applied on the pressing end 4121 first to let the switching element 412 be switched from the third position to the fourth position. Afterwards, moving the whole clamping module 4 upwards to the initial position, and then moving the mount base 1000 to have the second clamping element 42 abutted on the plate 2000 (see FIG. 5). As the first clamping element 3 is moved far away from the plate 2000, the mount base 1000 will be out of the supportable status. Next, an external force could be applied to resist the pre-torsional force of the elastic component 35 to pull the first clamping element 3 so that the first clamping element 3 can be pivoted toward the axis D with respect to the guiding rod element 1. The first end section 31 thus returns to the receiving space 14 and the connecting element 34 slides along the inclined surface 224 and abuts against the second extending section 222 of the hook 22 while the first clamping element 3 returns to the received position; therefore, the shaft 2 is switched to the unlocked position. Then removing the external force, the connecting element 34 and the hook 22 are engaged. The shaft 2 is then reset to the locked position. Finally, the mount base 1000 is able to be drawn away from the plate 2000 to complete the disassembly of the mount base 1000. Alternatively, the user may operate the mount base 1000 by screwing the switch unit 41 to have the switch unit 41 be rotated with respect to the guiding rod element 1, thereby gradually increasing the distance between the second clamping element 42 and the first clamping element 3 (see FIG. 5); however, it will be relatively time-consuming.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A mount base, detachably set in a hole of a plate, the mount base comprising:
    a guiding rod element extending along an axis and having a first end, a second end opposite to the first end, a main portion between the first end and the second end, and a receiving space, wherein the main portion is formed with a first external screw thread, and the receiving space extending from the first end to the second end along the axis;
    a shaft movably penetrating in the receiving space from the first end to be switched between a locked position and an unlocked position, wherein the shaft includes a hook;
    a first clamping element having a first end section, a second end section opposite to the first end section, a pivot section between the first end section and the second end section, and a connecting element disposed at the first end section, wherein the pivot section pivotably connects to the second end of the guiding rod element, and the first clamping element is able to be switched between a received position and a released position; and
    a clamping module being movably sleeved on the guiding rod element;
    wherein when the mount base penetrates through the hole of the plate and is at a supportable status, the first clamping element remains at the released position and clamps the plate with the clamping module, and when the first clamping element is switched to the received position, the mount base is removable from the hole.

2. The mount base as claimed in claim 1, wherein when the mount base penetrates through the hole of the plate and the shaft is switched from the locked position to an unlocked position along the axis, the first clamping element rotates to the released position by deviating from the axis with respect to the guiding rod element so that a distance between the clamping module and the first clamping element is able to be adjusted by adjusting a position of the clamping module with respect to the guiding rod element to clamp the plate; and when the first clamping element is at the received position, the connecting element of the first clamping element and the hook of the shaft are engaged so that the shaft is at the locked position and the mount base is removable from the hole.

3. The mount base as claimed in claim 2, wherein the first clamping element tends to be located at the released position.

4. The mount base as claimed in claim 3, wherein when an external force is applied to make the first clamping element rotate from the released position to the received position, the connecting element abuts against the hook to move the shaft to the unlocked position, then removing the external force so that the shaft backs to the locked position, and the connecting element and the hook are engaged.

5. The mount base as claimed in claim 4, wherein the hook has a first extending section and a second extending section connecting to the first extending section, wherein the first extending section and the second extending section jointly form an opening for locating the connecting element.

6. The mount base as claimed in claim 5, wherein the first extending section and the second extending section form an included angle less than 90 degrees.

7. The mount base as claimed in claim 5, wherein the connecting element is cylindrical, and the connecting element is able to slide with respect to the second extending section to engage with the opening when the first clamping element is switched to the received position.

8. The mount base as claimed in claim 5, wherein the hook has an inclined surface formed on the second extending section so that the connecting element is able to slide along the inclined surface to engage with the hook when the first clamping element is switched to the received position.

9. The mount base as claimed in claim 5, wherein the pressing element is a set screw.

10. The mount base as claimed in claim 5, wherein the first clamping element further has an elastic component being disposed at the pivot section and abutting against the guiding rod element and the pivot section therebetween so that the first clamping element is ordinarily located at the released position, and the first clamping element is located along the axis and at least the first end section is disposed in the receiving space when the first clamping element is at the received position.

11. The mount base as claimed in claim 10, wherein the elastic component is a torsion spring.

12. The mount base as claimed in claim 10, wherein the shaft further has a main body, a pressing element, a connected hole, a pressed elastic element, and a limit hole, wherein the main body has a first end portion and a second end portion opposite to the first end portion, the pressing element is disposed at the first end portion, the hook connects to the second end portion, the limit hole is formed on the main body, the connected hole is intercommunicated with the first end portion and the limit hole along the axis, and the pressed elastic element is disposed in the connected hole, and wherein the guiding rod element further has a through hole and a fixed rod penetrating through the through hole and the limit hole so that the pressed elastic element abuts against the pressing element and the fixed rod therebetween.

13. The mount base as claimed in claim 12, wherein the limit hole is an elongated hole, and when the shaft is switched from the locked position to the unlocked position, the fixed rod moves from a first position to a second position corresponding to the limit hole and the pressed elastic element is compressed increasingly.

14. The mount base as claimed in claim 13, wherein the pressing element is adjustably screwed to the first end portion to adjust a pre-compressed amount of the pressed elastic element.

15. The mount base as claimed in claim 14, wherein the first clamping element further has a limit surface, and wherein the limit surface abuts against a resisting portion of the second end so that the first clamping element is substantially perpendicular to the axis when the first clamping element is switched to the released position from the received position.

16. The mount base as claimed in claim 1, wherein the clamping module includes:
a switch unit being movably sleeved on the guiding rod element, and having a first internal screw thread selectively engaging with the first external screw thread; and
a second clamping element being movably sleeved on the guiding rod element and connecting to the switch unit.

17. The mount base as claimed in claim 16, wherein the switch unit further has a knob and a switching element, the knob has an elongated receiving portion for disposing the switching element, the switching element has a pressing end outwardly penetrating the knob, the first internal screw thread is formed on the switching element, and the switch unit is sleeved on the guiding rod element via the switching element;
wherein the switching element is able to be switched between a third position and a fourth position, wherein when the switching element is at the third position, the first internal screw thread and the first external screw thread are engaged and the switch unit is able to move along the axis in a manner of screwing with respect to the guiding rod element, whereas when the switching element is at the fourth position, the first internal screw thread detaches from the first external screw thread so that the switch unit is able to move along the axis without screwing on the guiding rod element.

18. The mount base as claimed in claim 17, wherein the switch unit further includes a circlip disposed on the knob, and the second clamping element at least partially clamped between the circlip and the knob, thereby the knob is able to rotate on the second clamping element about the axis.

19. The mount base as claimed in claim 17, wherein the second clamping element includes at least one sliding block, and the guiding rod element further includes at least one groove formed on the main portion parallel to the axis, wherein the at least one sliding block extends into the at least one groove so that the guiding rod element is able to linearly move along the axis with respect to the second clamping element.

20. The mount base as claimed in claim 17, wherein the switch unit further has a switching elastic element opposite to the pressing end and abutting against the knob and the switching element therebetween so that the switching element tends to be at the third position and when the switching element is at the fourth position, the degree of the compression of the switching elastic element is increased.

21. The mount base as claimed in claim 20, wherein the switching elastic element is a compression spring.

* * * * *